United States Patent
Vennelakanti et al.

(10) Patent No.: US 8,195,189 B2
(45) Date of Patent: Jun. 5, 2012

(54) MANAGING OF ITEMS DISTRIBUTED IN A GLOBAL SUPPLY CHAIN

(75) Inventors: Ravigopal Vennelakanti, Palo Alto, CA (US); Manish Gupta, Bangalore (IN)

(73) Assignee: Hewlett-Packard Developmet Company, L.P., Houston, TX (US)

( * ) Notice: Subject to any disclaimer, the term of this patent is extended or adjusted under 35 U.S.C. 154(b) by 1351 days.

(21) Appl. No.: 11/781,274

(22) Filed: Jul. 23, 2007

(65) Prior Publication Data

US 2008/0258915 A1 Oct. 23, 2008

(30) Foreign Application Priority Data

Apr. 17, 2007 (IN) .............................. 814/CHE/2007

(51) Int. Cl.
*H04W 24/00* (2009.01)
*H04M 11/04* (2006.01)
*H04M 3/42* (2006.01)

(52) U.S. Cl. .................. 455/456.1; 455/457; 455/404.1; 455/414.1

(58) Field of Classification Search .................. 455/500, 455/41.1, 444, 456.1, 457, 404.1, 414.1
See application file for complete search history.

(56) References Cited

U.S. PATENT DOCUMENTS

| | | | |
|---|---|---|---|
| 6,246,882 B1 * | 6/2001 | Lachance | 455/456.4 |
| 6,353,406 B1 * | 3/2002 | Lanzl et al. | 342/118 |
| 6,577,238 B1 * | 6/2003 | Whitesmith et al. | 340/572.1 |
| 6,745,027 B2 * | 6/2004 | Twitchell, Jr. | 455/422.1 |
| 6,812,824 B1 * | 11/2004 | Goldinger et al. | 340/10.1 |
| 6,823,199 B2 * | 11/2004 | Gough | 455/567 |
| 7,020,494 B2 * | 3/2006 | Spriestersbach et al. | 455/566 |
| 7,113,130 B2 * | 9/2006 | Zukowski et al. | 342/451 |
| 7,450,952 B1 * | 11/2008 | Kaundinya | 455/456.1 |
| 7,522,926 B2 * | 4/2009 | Chu et al. | 455/456.1 |
| 2006/0114145 A1 * | 6/2006 | Chu et al. | 342/118 |
| 2007/0257796 A1 * | 11/2007 | Easton et al. | 340/572.1 |

* cited by examiner

*Primary Examiner* — Tilahun B Gesesse

(57) ABSTRACT

A method for determining locations in a predefined area for placing a Radio Frequency Identification (RFID) reader in order to obtain a full coverage of the predefined area is provided. The method includes arranging a plurality of hexagonal area to form a combined area until the total area of the combined area is equal or larger than the predefined area, aligning the predefined area within the combined area, and determining the hexagonal area which is fully or partially covered by the predefined area. Each hexagonal area represents an area of coverage of the RFID reader, and the center of the hexagonal area which is determined to be fully or partially covered by the predefined area corresponds to one of the locations for placing the RFID reader.

18 Claims, 8 Drawing Sheets

MANAGING OF ITEMS DISTRIBUTED IN A GLOBAL SUPPLY CHAIN

CROSS REFERENCE TO RELATED APPLICATION

This application has, an India certified copy filed Dec. 23, 2008, a foreign priority application No. 814/CHW/2007 dated Apr. 17, 2007.

FIELD OF THE INVENTION

This invention relates generally to Radio Frequency Identification (RFID) technologies, and more particularly, to a method for determining locations in an area for placing RFID readers so as to obtain a full coverage of the area.

BACKGROUND OF THE INVENTION

Radio Frequency Identification (RFID) technology is the use of radio frequency waves (RF) to exchange information for identification purposes. A RFID system typically includes a RFID reader or transceiver having an antenna and a RFID tag or transponder containing unique information. The antenna of the RFID reader emits RF signals to activate any RFID tags within a reading range. The RFID tag, when within the vicinity of the RF signal, is activated by the RF signal from the RFID reader. This allows the RFID reader to reads the unique information in the RFID tag.

RFID technology has been widely used for tracking and monitoring products, for example, for inventory control in a warehouse. In inventory control system, a RFID tag containing a unique code is attached to each item in the warehouse. This allows each item in the warehouse to be uniquely identified by the unique code of the attached RFID tag. One or more RFID readers are installed at predefined locations to read the RFID tags attached to the items in the warehouse. By keeping track of all the unique codes read by the RFID readers, a person such as the warehouse owner would have an accurate knowledge of the inventory level. Accordingly, any discrepancy between inventory record and physical inventory is eliminated. The use of RFID technology in inventory control system also reduces any source of human errors which may arise in manual stock taking processes.

For any large scale deployment of RFID technology for inventory control system, the positioning of the RFID readers in the warehouse is crucial. Any brute force approach of positioning the RFID readers in the warehouse can lead to blind-spots in the RFID signal coverage or interferences between the RFID readers. Insufficient RFID readers in the warehouse may result in less than 100% area coverage of the RFID Reader signals, resulting in blind-spots. Accordingly, any RFID tags, and hence items, in one of the blind-spots will not be read by the RFID reader. However, if the RFID readers are spaced too closely together, interference among the RFID readers reduces the reliability and efficiency of the RFID system.

Accordingly, it is desirable to have a method to determine optimal positioning of the RFID readers in a warehouse that results in 100% coverage but yet do not have interferences among the RFID readers.

SUMMARY OF THE INVENTION

According to an embodiment, a method for determining locations in a predefined area for placing a Radio Frequency Identification (RFID) reader in order to obtain a full coverage of the predefined area is provided. The method includes arranging a plurality of hexagonal area to form a combined area until the total area of the combined area is equal or larger than the predefined area, aligning the predefined area within the combined area, and determining the hexagonal area which is fully or partially covered by the predefined area. Each hexagonal area represents an area of coverage of the RFID reader, and the center of the hexagonal area which is determined to be fully or partially covered by the predefined area corresponds to one of the locations for placing the RFID reader.

BRIEF DESCRIPTION OF THE DRAWINGS

The embodiments of the invention will be better understood in view of the following drawings and the detailed description.

DETAILED DESCRIPTION OF THE INVENTION

Figure 1:
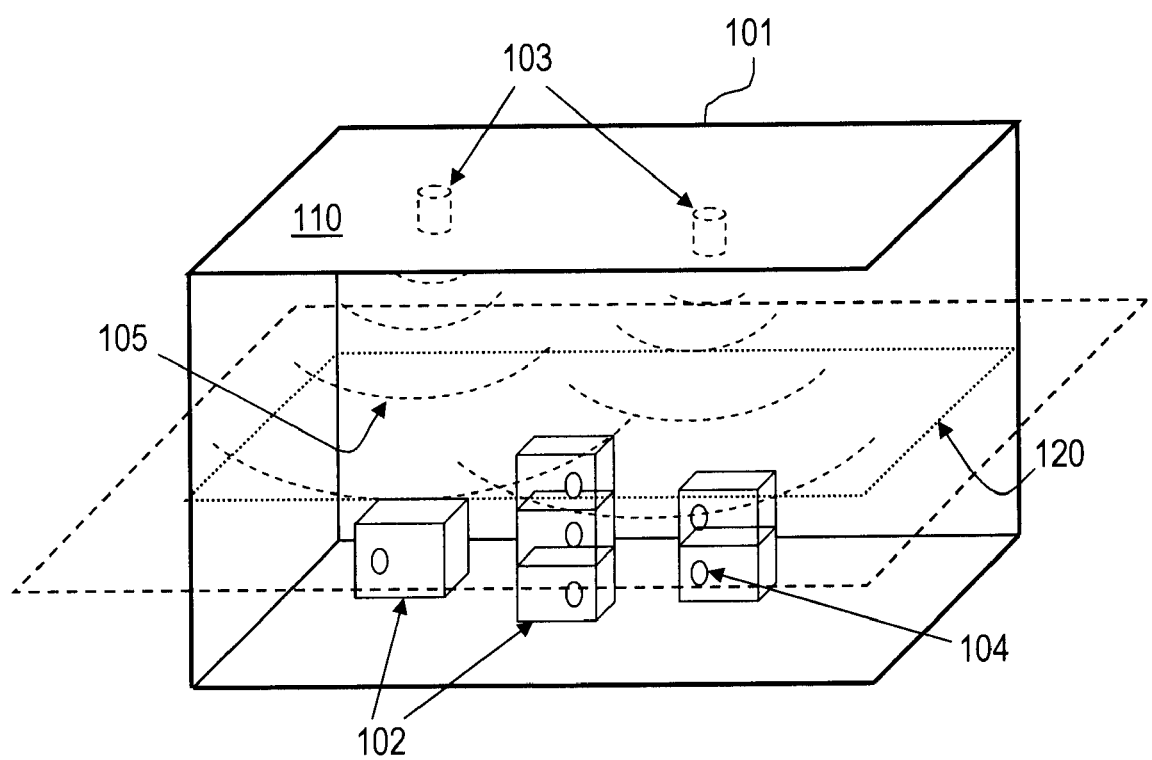
FIG. 1 shows an example of a warehouse in which an embodiment of the invention an be implemented.

FIG. 1 shows a warehouse 101 in which an embodiment of the invention can be implemented. The warehouse 101 stores items 102 as inventories to be tracked. Radio Frequency Identification (RFID) readers are attached to the ceiling 110 of the warehouse 101 and RFID tags 104 are attached to each item 102. The RFID readers 103 emit RFID signals 105 to activate the RFID tags 104 in the warehouse 101, and read RFID information of the activated RFID tags 104. The RFID information of each RFID tag contains a unique code. Each unique code corresponds to a specific item. By maintaining a database of the all the unique codes obtained from the RFID readers 103, an inventory of the items 102 in the warehouse 101 can be tracked.

Figure 2:
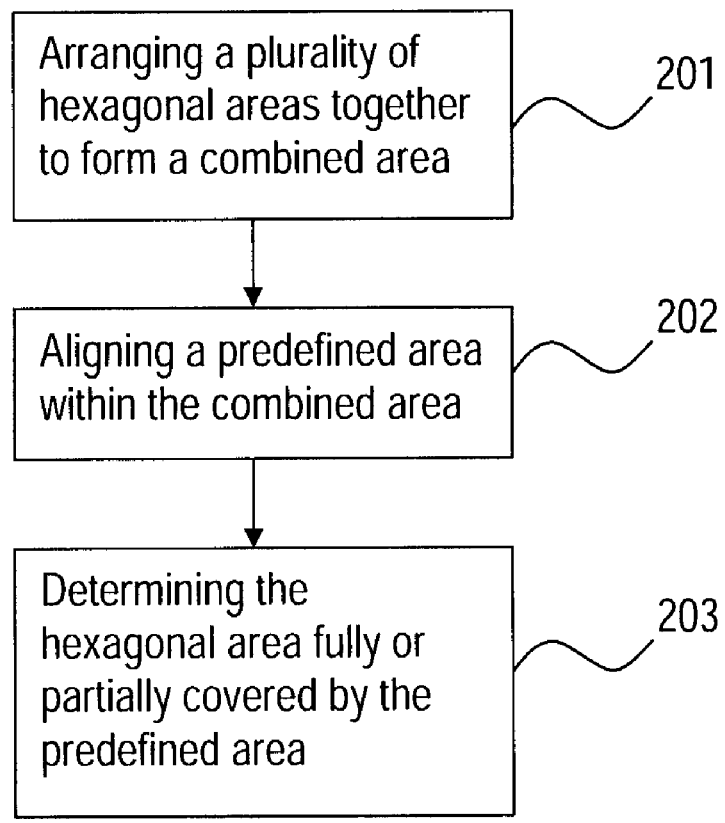
FIG. 2 shows a flow-chart of a method for determining locations for placing a RFID reader according to an embodiment.

FIG. 2 shows a flow-chart of a method for determining the locations for placing a RFID reader 103 in a predefine area. In this example, the predefined area represents a cross-sectional area 120 (see FIG. 1) of the warehouse 101 as described in FIG. 1. However, it should be noted that the predefined area may represent any area, for example, a cross-sectional area of rooms or enclosures. The RFID reader 103 in the embodiment is assumed to include a non-polarized antenna which can be assumed to have a circular range.

Figure 3:
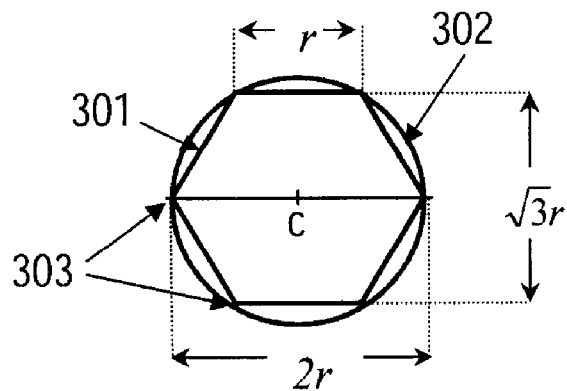
FIG. 3 shows a hexagonal area representing a circular reading range of the RFID reader having a radius r, with the RFID reader at the center c of the hexagonal area.

Step 201 includes arranging a plurality of hexagonal areas together to form a combined area. Each hexagonal area represents the reading range of the RFID reader 103. FIG. 3 shows the hexagonal area 301 which represents the circular reading range 302 of the RFID reader 103 having a radius r, with the RFID reader 103 at the center c of the hexagonal area 301. As can be seen from FIG. 3, the length from the center c to any vertex 303 of the hexagonal area 301 is r. Accordingly, the length of any sides of the hexagonal area 301 is also r.

Figure 4:
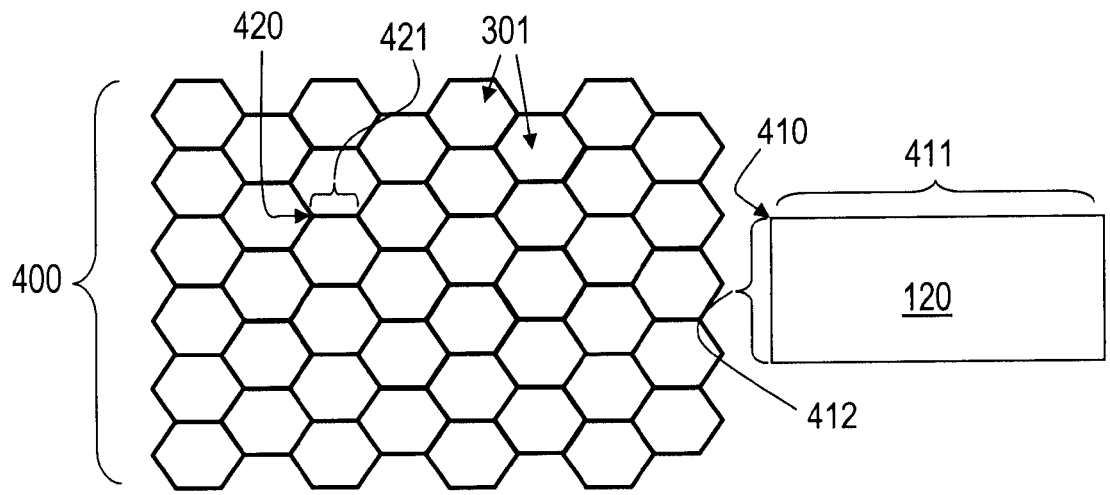
FIG. 4 shows a plurality of hexagonal areas arranged together to form a honeycomb combined area according to an embodiment.

In an embodiment, the hexagonal areas 301 are arranged together as a honeycomb of hexagonal areas to form the combined area as shown in FIG. 4. In other words, there are no gaps between any two hexagonal areas 301 in the combined area. The forming of the combined area 400 by arranging the hexagonal areas 301 together should stop only when the combined area 400 is sufficient to cover or larger than the predefined area 120. The number of hexagonal areas 301 needed to form the combined area 400 which is equal to or larger than the predefined area 120 depends on the reading range r of the RFID reader 103. The larger the reading range r, the fewer the number of hexagonal areas 301 is needed to form the combined area 400.

Step 202 of FIG. 2 includes aligning the predefined area 120 within the combined area 400. There are many possible ways of aligning the predefined area 120 within the combined area 400. For example, a brute force approach of positioning a hexagonal area 301 at a corner of the predefined area 120 as a reference hexagon may be used. Further possible alignments may be obtained by rotating the reference hexagon by a certain angle.

A method for determining an optimized alignment of the predefined area 120 with the combined area 400 will be described as an embodiment. In this embodiment, the predefined area 120 is a rectangular area. Referring to FIG. 4, the rectangular area 120 is arranged within the combined area 400 such that a vertex 410 of the rectangular area 120 coincides with a vertex 420 of a hexagonal area 301, and an edge 411 of the rectangular area 120 joining the vertex 410 coincides with an edge 421 of the hexagonal area joining the vertex 421. Since the rectangular area 120 has two possible orientations, this results in two possible alignments as shown in FIG. 5 and FIG. 6.

Figure 5:
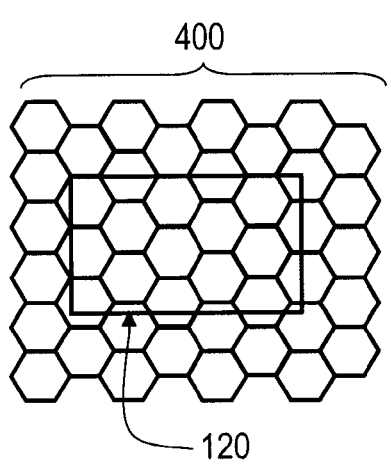
FIG. 5 shows a first type of alignment of the predefined area on the combined area according to an embodiment.
Figure 6:
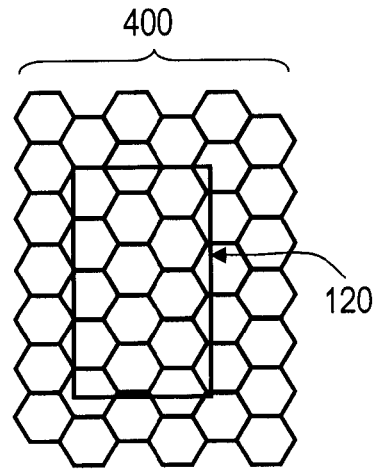
FIG. 6 shows a second type of alignment of the predefined area on the combined area according to an embodiment.
Figure 7:
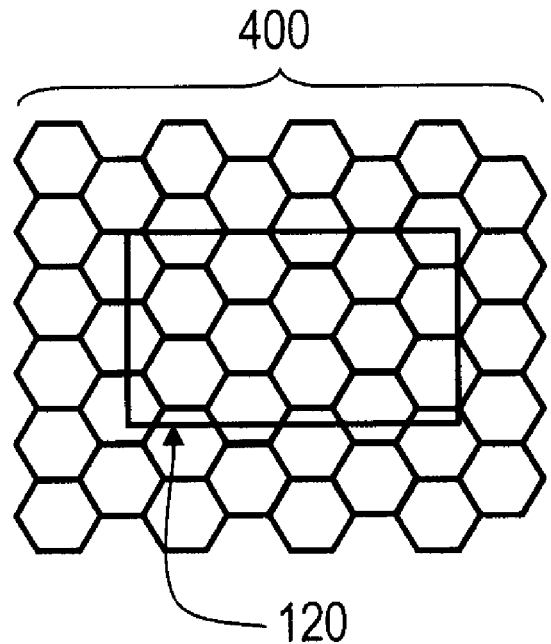
FIG. 7 shows the first type of alignment of the predefined area being moved along a direction of the coinciding edges of the predefined area and a hexagonal area according to an embodiment.

It should be noted that each of the two possible alignments shown in FIG. 5 and FIG. 6 allows only one degree of movement along the direction of the coinciding edges 411, 421. The aligned rectangular area 120 is only allowed to move along the direction of the coinciding edges 411, 412 until it touches the vertex of an end hexagonal area 301 which is covered by the rectangular area 120. FIG. 7 shows an example of the aligned rectangular area 120 in FIG. 5 being moved along the direction of the coinciding edges 411, 421 until it touches the vertex of the end hexagonal area.

The alignment having the fewest number of hexagonal areas 301 which are either fully or partially covered by the rectangular area 120 corresponds to the optimized alignment of the predefined area 120 with the combined area 400. The calculation of the number of hexagonal areas 301 fully or partially covered by the rectangular area 120 will now be described with reference to FIG. 8 and FIG. 9.

Figure 8:
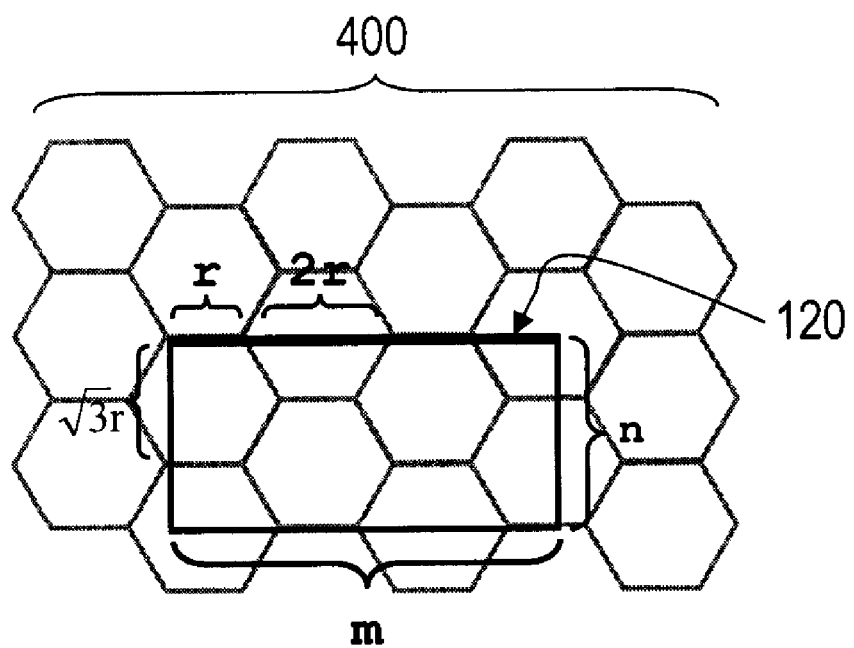
FIG. 8 shows a close-up view of a rectangular area as the predefined area being aligned with the combined area according to an embodiment.

FIG. 8 shows the rectangular area 120 being aligned on the combined area 400. The rectangular area 120 has a length m and a width n. The length of each edge of the hexagonal area 301 is r (which is also the length from the centre to each vertex of the hexagonal area). The number of hexagonal areas which are either fully or partially covered by the rectangular area 120 is:

$$Z = x*y + V_{additional} - \delta \qquad (1)$$

where Z is, the number of hexagonal area 301 covered by the rectangular area 120, x is the number of hexagonal area in the horizontal direction (see edge 411 of FIG. 4), y is the number of hexagonal area in the vertical direction (see edge 412 of FIG. 4), $V_{additional}$ is the additional hexagonal area(s), and $\delta$ is a correction factor for certain boundary conditions.

The length covered by the edge 411 (see FIG. 4) of the rectangular area 400 in an addition of r and 2r in alternates. Therefore, the number of complete "r–2r" pair is $$\left\lfloor \frac{m}{3r} \right\rfloor.$$

Since each "r–2r" covers 2 hexagonal areas, the number of hexagonal areas in the complete "r–2r" pair is:

$$H_{complete} = 2\left(\left\lfloor \frac{m}{3r} \right\rfloor\right) \qquad (2)$$

wherein $H_{complete}$ is the number of hexagonal areas in the complete "r–2r" pair.

The fractional "r–2r" pair, if any, at the end of the rectangular area 120 is $$\frac{m}{3r} - \left\lfloor \frac{m}{3r} \right\rfloor.$$

Therefore, the number of "r" in the fractional "r–2r" pair is:

$$E_{fraction} = 3\left(\frac{m}{3r} - \left\lfloor \frac{m}{3r} \right\rfloor\right) \qquad (3)$$

wherein $E_{fraction}$ is the number of "r" in the fractional "r–2r" pair.

Figure 9:
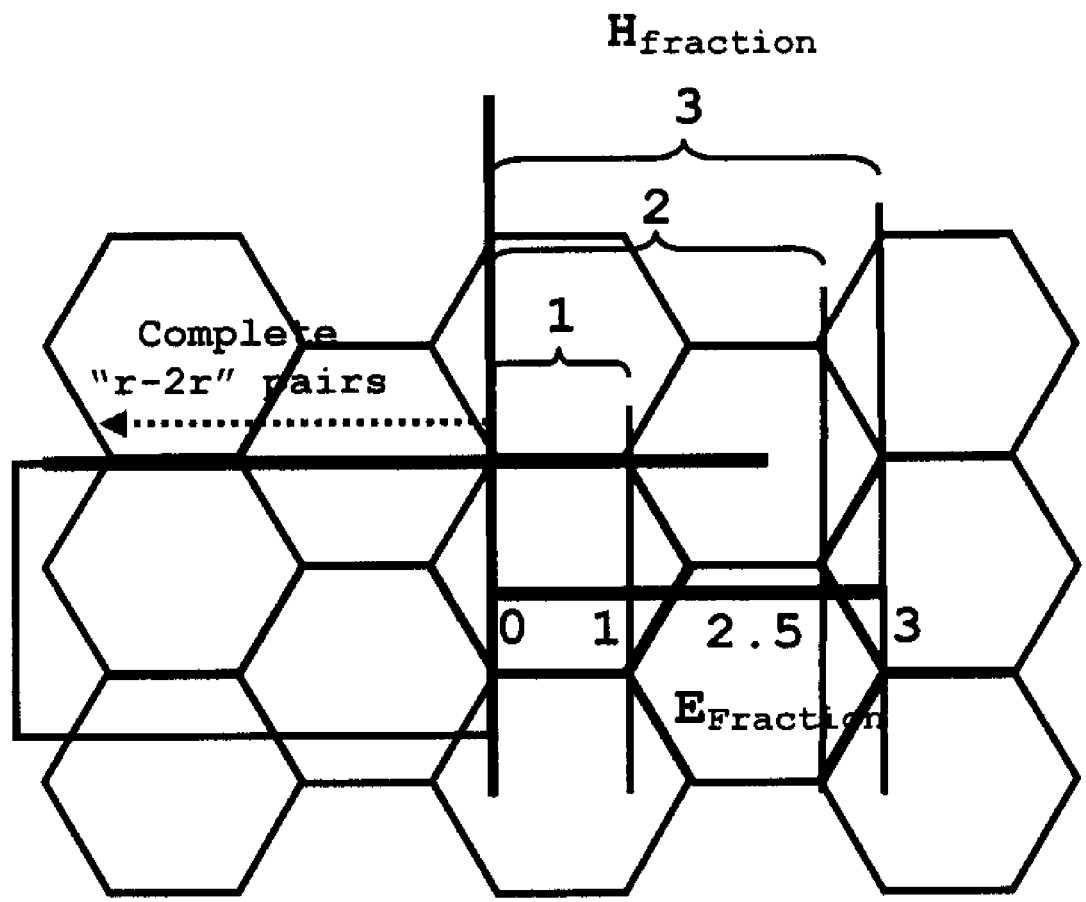
FIG. 9 shows an illustration of the number of hexagonal areas that are needed ($H_{fraction}$) for different values of $E_{fraction}$ according to an embodiment.

FIG. 9 shows an illustration of the number of hexagonal areas that are needed ($H_{fraction}$) for different values of $E_{fraction}$ according to an embodiment. As can be seen from FIG. 9, when $E_{fraction}$ is between 0 and 1, the number of hexagonal areas needed to cover the fractional "r–2r" pair is 1. When $E_{fraction}$ is more than 1 but equal but less than 2.5, the number of hexagonal areas needed to cover the fractional "r–2r" pair is 2. When $E_{fraction}$ is more than 2.5 but less than 3, the number of hexagonal areas needed to cover the fractional "r–2r" pair is 3. The relationship between the number of hexagonal areas needed to cover the fractional "r–2r" pair and $E_{fraction}$ can be summarized using the following equation:

$$H_{fraction} = \begin{cases} 1, & \text{if } 0 \leq E_{frac} \leq 1 \\ 2, & \text{if } 1 < E_{frac} \leq 2.5 \\ 3, & \text{if } 2.5 < E_{frac} < 3, \end{cases} \quad (4)$$

wherein $H_{fraction}$ is the number of hexagonal areas needed to cover the fractional "r–2r" pair. Therefore, the total number of hexagonal areas covered by the rectangular area 120 in the horizontal direction x is:

$$x = H_{complete} + H_{fraction} \quad (5)$$

The length covered by the edge 412 (see FIG. 4) of the rectangular area 400 is $\sqrt{3}r$ for each hexagonal area covered. Therefore, the number of hexagonal areas covered by the rectangular area 120 in the vertical direction covered by the rectangular area 120 in the vertical direction y is:

$$y = \frac{n}{\sqrt{3}\,r} \quad (6)$$

If the $$\frac{n}{\sqrt{3}\,r} - y$$

is greater than 0.5, then we need to add additional hexagonal areas to the total number of hexagonal areas covered by the rectangular area 120. In other words, if $\sqrt{3}(y+0.5)r < n$, then:

$$V_{additional} = \left\lfloor \frac{x}{2} \right\rfloor \quad (7)$$

In addition, 2 cases of boundary conditions need to be considered. The first case to consider is when:

$$1 < E_{fraction} < 1.5 \quad (8)$$

and $$\sqrt{3}(y-0.5)r < n < \sqrt{3}(y)r \quad (9)$$

The correction factor is:

$$\delta = \begin{cases} 1, & \text{if } (n - \sqrt{3}\,r(y - 0.5)) + (E_{fraction} - 1)r \leq \frac{\sqrt{3}\,r}{2} \\ 0, & \text{otherwise} \end{cases} \quad (10)$$

The second case to consider is when:

$$2.5 < E_{fraction} < 3 \quad (11)$$

and $$\sqrt{3}(y-1)r < n < \sqrt{3}(y0.5)r \quad (12)$$

The correction factor is:

$$\delta = \begin{cases} 1, & \text{if } (n - \sqrt{3}\,r(y - 1)) + (E_{fraction} - 2.5)r \leq \frac{\sqrt{3}\,r}{2} \\ 0, & \text{if otherwise} \end{cases} \quad (13)$$

Combining (10) and (13), the correction factor is determined using the following expression:

$$\delta = \begin{cases} 1, & \begin{array}{l} \text{if } (n - \sqrt{3}\,r(y - 0.5)) + \\ (E_{frac} - 1)r \leq \frac{\sqrt{3}\,r}{2} \text{ and } 1 < E_{fraction} < \\ 1.5 \text{ and } \sqrt{3}(y - 0.5)r < n < \sqrt{3}(y)r \end{array} \\ 1, & \begin{array}{l} \text{if } (n - \sqrt{3}\,r(y - 1)) + \\ (E_{frac} - 2.5)r \leq \frac{\sqrt{3}\,r}{2} \text{ and } 2.5 < E_{fraction} < \\ 3 \text{ and } \sqrt{3}(y - 1)r < n < \sqrt{3}(y0.5)r \end{array} \\ 0, & \text{otherwise} \end{cases} \quad (14)$$

Combining equations (1), (2), (4), (5) and (6), the total number of hexagonal areas covered by the rectangular area 120 is:

$$Z = \left[ 2\left(\left\lfloor \frac{m}{3r} \right\rfloor\right) + H_{fraction} \right] * \left\lfloor \frac{n}{\sqrt{3}\,r} \right\rfloor + V_{additional} - \delta \quad (15)$$

The $V_{additional}$ is determined using equation (7) and δ is determined using (15). The alignment of the rectangular area 120 with the combined area 400 which covers the fewest number of hexagonal areas (that is, the lowest value of Z) is the optimized alignment of the predefined area 120 with the combined area 400.

Step 203 of FIG. 2 includes determining the hexagonal areas which are fully or partially covered by the predefined area 120. Using the optimized alignment of the predefined area 120 with the combined area 400 determined as described above, the hexagonal areas covered by the predefined area 120 can be determined, for example, by physically marking the hexagonal areas. The center of each of the hexagonal areas determined to be fully or partially covered by the predefined area 120 corresponds to a location for placing the RFID reader 103 in the predefined area 120. If the predefined area 120 represents a warehouse, one RFID reader 103 may be mounted it the ceiling of the warehouse at each location which is determined for placing the RFID reader 103. Accordingly, a full coverage of the warehouse or the predefined area by the RFID readers 103 is achieved.

Figure 10:
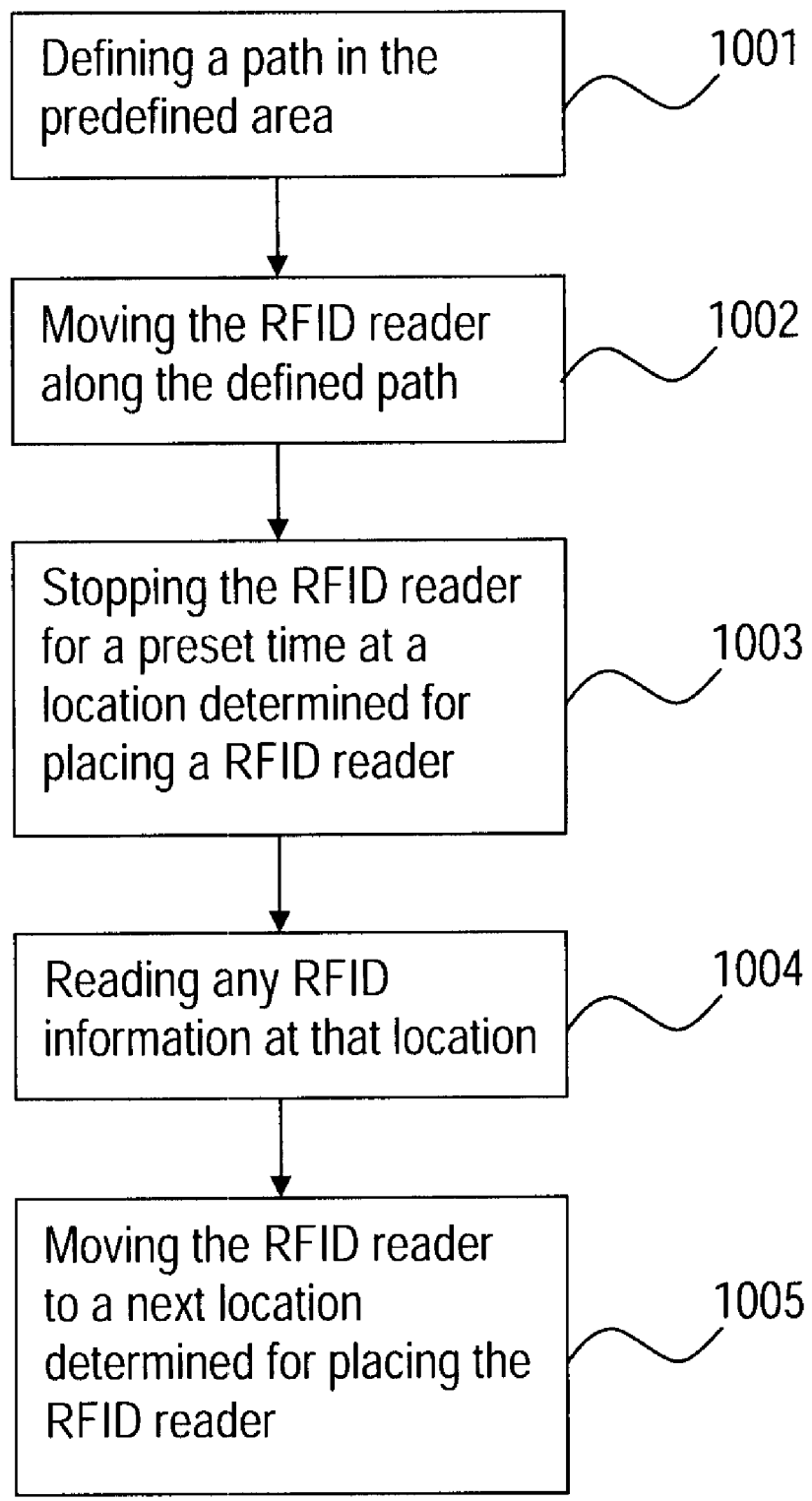
FIG. 10 shows a flow-chart of a method for reading RFID information from RFID tags in the predefined area using a moveable RFID reader according to an embodiment.

In an embodiment, a mobile RFID reader is used. The mobile RFID is moved along a predefined path in the predefined area to read RFID information from RFID tags. The determined locations for placing RFID readers form a grid layout along which the path where RFID reader moves is defined. FIG. 10 shows a flow-chart of a method for reading RFID information from RFID tags using a moveable RFID reader according to an embodiment.

Step 1001 includes defining a path in the predefined area 120. The path is defined such that it passes through all the locations determined for placing a RFID reader. Step 1002 includes moving the mobile RFID reader along the defined path in the predefined area. When the mobile RFID reader reaches a location determined for placing a RFID reader, the mobile RFID reader stops at the location for a preset time at step 1003. At that location, the mobile RFID reader reads any RFID information from any RFID tags within its reading range (Step 1004). Step 1005 includes moving the mobile RFID reader to a next location determined for placing a RFID reader. At the next location, the mobile RFID stops and reads any RFID information before proceeding to another location, until it reaches the end of the defined path. Thereafter, the mobile RIGID reader returns to the start of the defined path, and the process is repeated.

By using mobile RFID reader instead of placing one RFID reader at every determined location, possible interference between any adjacent RFID readers is avoided or greatly reduced. This greatly increases the reliability and efficiency of the RFID system.

When the RFID system according to the embodiment is implemented in the warehouse, channel rail may be attached to the ceiling of the warehouse. The layout of the channel rail is defined according to the defined path, that is, it passes through all the locations determined for placing a RFID reader. The mobile RFID reader is suspended from the channel rail, and is moved along rail (which corresponds to the defined path).

In an embodiment, the locations determined for placing a RFID reader are represented using co-ordinates, and each of the co-ordinates corresponds to an absolute location of the center of a hexagonal area in the warehouse. Accordingly, a mapping between the co-ordinates of the locations for placing the RFID readers and the corresponding absolution locations in the warehouse is maintained.

Figure 11:
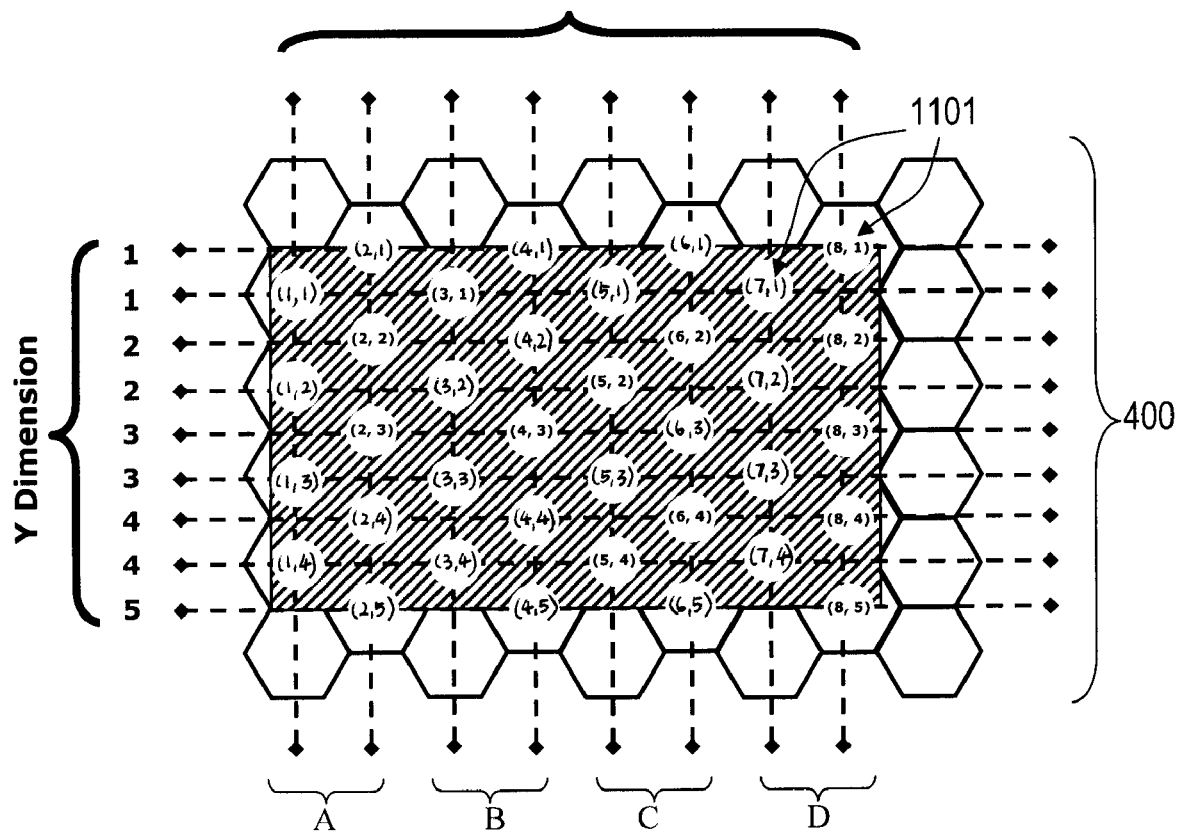
FIG. 11 shows the ($x_i$, $y_i$) coordinates of the locations for placing the RFID readers according to an embodiment.

The co-ordinates may be represented as $(x_i, y_i)$, where $x_i$ is the x-coordinate and $y_i$ is the y-coordinate. The absolute location may also be represented as $(X_{abs}, Y_{abs})$, where $X_{abs}$ and $Y_{abs}$ are the absolute coordinates of the center of the hexagonal areas. FIG. 11 shows the $(x_i, y_i)$ coordinates of the locations for placing the RFID readers according to an embodiment.

The top left corner of the predefined area is used as a reference point with co-ordinates (0,0) in an embodiment. Therefore, the absolute coordinates are calculated as:

$$X_{abs} = \frac{r(3x_i - 2)}{2}, \quad (16)$$

$$Y_{abs} = \frac{\sqrt{3}\, r(2y_i - 1)}{2}, \text{ if } x_i \text{ is an odd number,} \quad (17)$$

$$Y_{abs} \sqrt{3}\, r(y_i - 1), \text{ if } x_i \text{ is an even number.} \quad (18)$$

A sequence of stop-and-read points for the mobile RFID reader guides the movement of the reader inside the warehouse. A movement from (1,1) to (1,2) may require the mobile RFID reader to move 50 inches in the y-direction. The mapping between the coordinates and the absolute coordinates, and the sequence of movements may be part of a reader controller application or stored inside a storage medium of the RFID reader. A route optimization algorithm may be needed to find an optimal sequence of stop-and-read points for the mobile RFID reader. Standard algorithms from Graph Theory and combinatorial optimization disciplines can be used for route optimization:

Shortest Path (e.g. Dijkstra's Algorithm)
Minimum Spanning Trees
Minimum weight spanning tree (e.g. Kruskal's Algorithm)
Traveling Salesman Problem (heuristics based solutions).

It should be noted that which algorithm to be used depends on the problem, environment and any available data.

It is also possible to sub-divide the predefined area 120 into sub-areas, and one mobile RFID reader is used in each sub-area for reading RFID information. In this embodiment, steps 1001-1005 of FIG. 10 described above are then performed for each of the sub-areas to read RFID information of RFID tags in the sub-area using a mobile RFID reader. The movement of the mobile RFID readers in each sub-area should be defined such that no two mobile RFID readers are too close to interfere with each other.

As an example, the predefined area 120 in FIG. 11 may be sub-divided into 4 sub-areas A, B, C and D. The sequence of stop-and-read points for sub-area A may be (1,1), (1,2), (1,3), (1,4), (2,5), (2,4), (2,3), (2,2) and (2,1). After the mobile RFID reader in sub-area A reaches the last point (2,1), it moves back to the starting point (1,1) and repeats the sequence. The sequence of stop-and-read points for sub-area B may be (3,1), (3,2), (3,3), (3,4), (4,5), (4,4), (4,3), (4,2) and (4,1). The sequence of stop-and-read points for sub-area C may be (5,1), (5,2), (5,3), (5,4), (6,5), (6,4), (6,4), (6,2) and (6,1). And the sequence of stop-and-read points for sub-area D may be (7,1), (7,2), (7,3), (7,4), (8,5), (8,4), (8,3), (8,2) and (8,1).

It is noted that in the warehouse, it may not be possible to place the RFID reader in a certain location, or there may be some structures in the warehouse which might obstruct the reading field of the RFID reader. If the reading range r of the RFID reader is comparable to the dimensions of the structures, the RFID reader may be re-positioned or an additional RFID reader may be used. However, if the reading range r of the RFID reader is much smaller than the dimensions of the structures, the predefined area representing the warehouse may be subdivided into smaller areas around the structures, and the optimized locations for placing the RFID readers in those smaller areas are determined.

Figure 12:
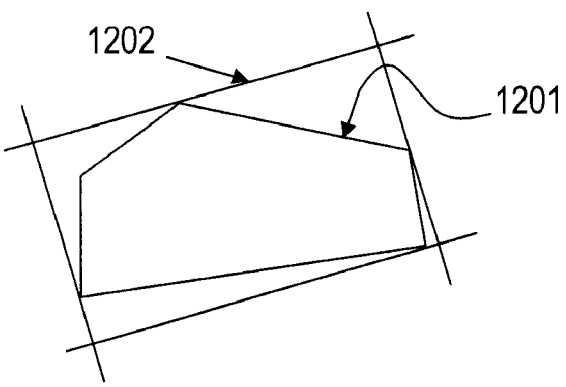
FIG. 12 shows a minimum area enclosing rectangle (MAER) 1202 for a polygonal shape.

If the warehouse has a non-rectangular polygonal shape 1201 as shown in FIG. 12, a minimum area enclosing rectangle (MAER) 1202 for the polygonal shape 1201 may be determined. The MAER may be determined using existing techniques such as the rotating calipers algorithm. The MAER can then be represented by the rectangular predefined area 120, and the optimized locations for placing a RFID reader can be determined according to the method as described in the above embodiments.

The embodiments are described in two dimensions. It should be noted that they can be extended to three dimensions. In such a 3-dimensional case, hexagonal cylinders instead of hexagonal areas are used to determine the 3-dimensional locations for placing the RFID readers. The coordinates of the locations for placing the RFID readers would be represented as $(x_i, y_i, z_i)$, where $z_i$ is the z-coordinate. The absolute location may also be represented as $(X_{abs}, Y_{abs}, Z_{abs})$, where $X_{abs}$, $Y_{abs}$ and $Z_{abs}$ are the absolute coordinates of the center of the hexagonal cylinders.

Figure 13:
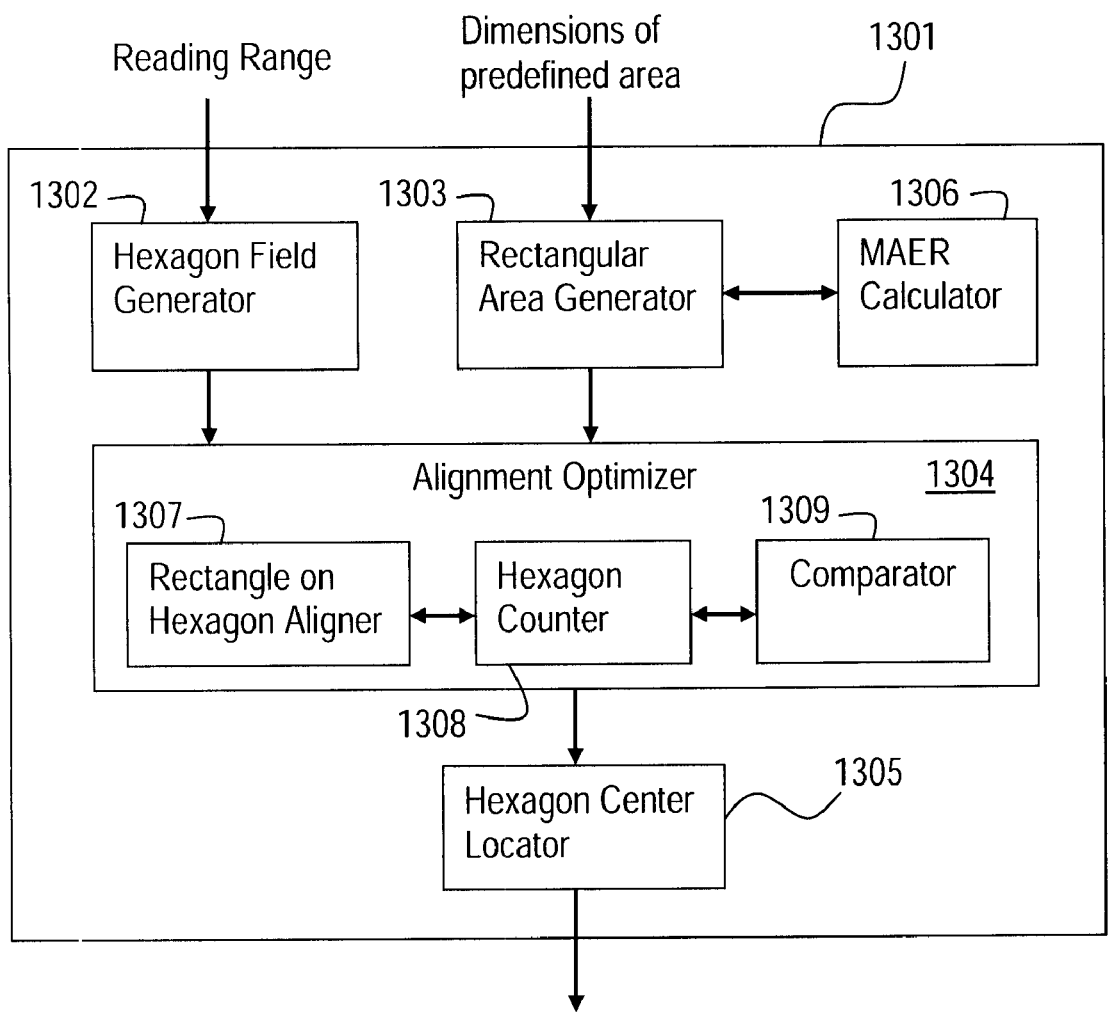
FIG. 13 shows a block diagram of a location optimizing unit for determining the location in the predefined area for placing the RFID reader according to an embodiment.

FIG. 13 shows a block diagram of a location optimizing unit for determining the locations in the predefined area for placing the RFID reader according to an embodiment. The location optimizing unit 1301 includes a hexagon field generator 1302, a rectangular area generator 1303, a MAER calculator 1306, an alignment optimizer 1304 and a hexagon center locator 1305.

The hexagon field generator 1302 receives the reading range of the RFID reader as input and generates the combined area which is comprised of the honeycomb of hexagonal areas (see FIG. 4). As already described earlier, each hexagonal area represents the circular reading range of the RFID reader, and the length of each side of the hexagonal area is equal to the radius r of the circular reading range.

The rectangular area generator 1303 receives the dimensions of the predefined area, for example the warehouse, as input and generates a rectangular area representing the predefined area or the warehouse. In the case where the predefined area is a non-rectangular shape, the rectangular area generator 1303 passes the dimensions of the predefined area to the MAER (Minimum Area Enclosing Rectangle) calculator 1306 to determine the smallest rectangle that encloses the predefined area. The MAER calculator 1306 returns the dimensions of the smallest rectangle to the rectangular area generator 1303.

The alignment optimizer 1304 receives the combined area from the hexagon field generator 1302 and the rectangular area from the rectangular area generator 1303 as inputs and determines an optimized alignment of the rectangular area with the combined area in such a way that the rectangular area totally or partially covers a minimum number of hexagonal areas. The optimized alignment may be generated according to the method already described earlier with reference to FIG. 4-7. The alignment optimizer 1304 generates as output a combined hexagonal field (represented by the hexagonal areas totally or partially covered by the predefined area) covering the predefined area or the warehouse.

The hexagon center locator 1305 receives the combined hexagonal field from the alignment optimizer 1304 as input, and determines a list of coordinates of the center of each of the hexagonal area of the combined hexagonal field. The list of coordinates corresponds to the locations for putting a RFID reader in order to obtain a full coverage of the predefined area.

In an embodiment, the alignment optimizer 1304 includes a rectangle on hexagon aligner 1307, a hexagon counter 1308 and a comparator 1309. The rectangle on hexagon aligner 1307 receives the combined area and the rectangular area, and aligns the rectangular area on the combined area in all possible ways in order to generate the most optimized alignment.

For each alignment generated by the rectangle on hexagon aligner 1307, the hexagon counter 1308 calculates the number of hexagonal areas of the combined area that are fully or partially covered by the predefined area. The number of hexagonal areas may be calculated using equation (15) which corresponds to the method described earlier with reference to FIG. 8-9.

The comparator 1309 compares the number of hexagonal areas of the various alignments and identifies the alignment which requires the minimum number of hexagonal areas. The alignment requiring the minimum number of hexagonal areas is the optimized alignment of the rectangular area with the combined area as determined by the alignment optimizer 1304.

Although the present invention has been described in accordance with the embodiments as shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for determining locations in a predefined area for placing a Radio Frequency Identification (RFID) reader in order to obtain a full coverage of the predefined area, comprising:
arranging a plurality of hexagonal areas together to form a combined area until the total area of the combined area is at least equal to the predefined area, wherein each hexagonal area represents an area of coverage of the RFID reader;
aligning the predefined area within the combined area; and
determining the hexagonal areas which are at least partially covered by the predefined area,
wherein the center of the hexagonal area which is determined to be at least partially covered by the predefined area corresponds to one of the locations for placing the RFID reader.

2. The method of claim 1, wherein the plurality of hexagonal area in the combined area are arranged in such a way that there are no gaps between each hexagonal area.

3. The method of claim 1, wherein the length of each edge of the hexagonal area is equal to a reading range of the RFID reader.

4. The method of claim 1, wherein the predefined area is a rectangular area.

5. The method of claim 4, wherein the rectangular area is the smallest area of rectangle that encloses the predefined area determined using a Minimum Area Enclosing Rectangle (MAER) algorithm.

6. The method of claim 4, wherein aligning the predefined area within the combined area comprises arranging the rectangular area on the combined area such that a vertex of the rectangular area coincides with a vertex of a hexagonal area in the combined area, and an edge of the rectangular area extending from the vertex of the rectangular area coincides with an edge of the hexagonal area extending from the vertex of the hexagonal area.

7. The method of claim 6, further comprising:
determining the number of hexagonal areas which are fully or partially covered by the rectangular area; and
selecting an alignment of the rectangular area on the combined area which results in the lowest number of hexagonal area which is fully or partially covered by the rectangular area as the optimized alignment.

8. The method of claim 7, wherein the number of hexagonal areas which are fully or partially covered by the rectangular area is determined using the following expression:

$$Z = \left[2\left(\left\lfloor\frac{m}{3r}\right\rfloor\right) + H_{fraction}\right] * \left\lceil\frac{n}{\sqrt{3}\,r}\right\rceil + V_{additional} - \delta$$

wherein

Z is the total number of hexagonal areas which are fully or partially covered by the rectangular area;

m is the length of an edge of the rectangular area along a first direction;

n is the length of another edge of the rectangular area along a second direction which is perpendicular to the first direction;

r is the length of an edge of the hexagonal area;

$$H_{fraction} = \begin{cases} 1, & \text{if } 0 \leq E_{frac} \leq 1 \\ 2, & \text{if } 1 < E_{frac} \leq 2.5 \\ 3, & \text{if } 2.5 < E_{frac} < 3 \end{cases} \text{ wherein } E_{frac} = 3\left(\frac{m}{3r} - \left\lfloor\frac{m}{3r}\right\rfloor\right);$$

$V_{additional}$ is the additional hexagonal area(s), and $\delta$ is a correction factor for certain boundary conditions.

9. The method of claim 8, wherein $$V_{additional} = \left\lfloor\frac{x}{2}\right\rfloor \text{ if } \sqrt{3}\,(y+0.5)r < n; \text{ and}$$

$$\delta = \begin{cases} 1, & \begin{array}{l}\text{if } (n - \sqrt{3}\,r(y-0.5)) + \\ (E_{frac} - 1)r \leq \frac{\sqrt{3}\,r}{2} \text{ and } 1 < E_{fraction} < \\ 1.5 \text{ and } \sqrt{3}\,(y-0.5)r < n < \sqrt{3}\,(y)r\end{array} \\ 1, & \begin{array}{l}\text{if } (n - \sqrt{3}\,r(y-1)) + \\ (E_{frac} - 2.5)r \leq \frac{\sqrt{3}\,r}{2} \text{ and } 2.5 < E_{fraction} < \\ 3 \text{ and } \sqrt{3}\,(y-1)r < n < \sqrt{3}\,(y0.5)r\end{array} \\ 0, & \text{otherwise} \end{cases}$$

wherein x is the number of hexagonal areas covered by the edge of the rectangular area along the first direction, and y is the number of hexagonal areas covered by the edge of the rectangular area along the second direction.

10. The method of claim 1, further comprising placing a RFID reader at the centre of every RFID reader which is determined to be fully or partially covered by the predefined area.

11. The method of claim 1, further comprising:
defining a path in the predefined area, wherein the path is defined such that it passes through all the locations determined in the predefined area for placing the RFID reader;
moving the RFID reader along the defined path in the predefined area;
stopping the RFID reader for a preset time at a location determined for placing a RFID reader;
reading any RFID information at that location; and
moving the RFID reader to a next location determined for placing the RFID reader.

12. The method of claim 1, further comprising:
dividing the predefined area into a plurality of sub-areas;
providing a RFID reader for each sub-area; and
in each sub-area:
defining a path in the sub-area, wherein the path is defined such that it passes through all the locations in the sub-area determined for placing the RFID reader;
moving the RFID reader along the defined path in the sub-area,
stopping the RFID reader for a preset time at a location in the sub-area determined for placing a RFID reader;
reading any RFID information at that location; and
moving the RFID reader to a next location in the sub-area determined for placing the RFID reader.

13. A location optimizing unit for determining locations in a predefined area for placing a Radio Frequency Identification (RFID) reader in order to obtain a full coverage of the predefined area, comprising:
a hexagon field generator for receiving a reading range of the RFID reader and generating a combined area comprised of a plurality of hexagonal areas, wherein the length of each edge of the hexagonal area represents the reading range of the RFID reader;
a rectangular area generator for receiving dimensions of the predefined area and generating a rectangular area representing the predefined area;
an alignment optimizer for receiving the combined area and the rectangular area, and aligning the rectangular area with the combined area and determining the hexagonal areas which are at least partially covered by the rectangular area; and
a hexagon center locator for determining the centre of the hexagonal areas which fully are at least partially covered by the rectangular area,
wherein the determined center of the hexagonal areas corresponds to the locations for placing the RFID reader.

14. The location optimizing unit of claim 13, wherein the alignment optimizer determines the alignment of the rectangular area with the combined area such that rectangular area covers the lowest number of hexagonal areas in the combined area as the optimized alignment.

15. The location optimizing unit of claim 14, wherein the alignment optimizer further comprises:
a rectangle on hexagon aligner for aligning the rectangular area with the combined area in all possible ways;
a hexagon counter for calculating the number of hexagonal areas in the combined area that are fully or partially covered by the rectangular area for each possible alignment from the rectangle on hexagon aligner; and
a comparator for comparing the number of hexagonal areas of each possible alignments and identifying the alignment which requires the lowest number of hexagonal areas.

16. The location optimizing unit of claim 15, wherein the hexagon counter calculates the number of hexagonal areas which are fully or partially covered by the rectangular area using the following expression:

$$Z = \left[2\left(\left\lfloor \frac{m}{3r} \right\rfloor\right) + H_{fraction}\right] * \left\lceil \frac{n}{\sqrt{3}\,r} \right\rceil + V_{additional} - \delta$$

wherein
Z is the total number of hexagonal areas which are fully or partially covered by the rectangular area;
m is the length of an edge of the rectangular area along a first direction;
n is the length of another edge of the rectangular area along a second direction which is perpendicular to the first direction;
r is the length of an edge of the hexagonal area;

$$H_{fraction} = \begin{cases} 1, & \text{if } 0 \leq E_{frac} \leq 1 \\ 2, & \text{if } 1 < E_{frac} \leq 2.5 \text{ wherein } E_{frac} = 3\left(\frac{m}{3r} - \left\lfloor \frac{m}{3r} \right\rfloor\right); \\ 3, & \text{if } 2.5 < E_{frac} < 3 \end{cases}$$

$V_{additional}$ is the additional hexagonal area(s), and
δ is a correction factor for certain boundary conditions.

17. The location optimizing unit of claim 16, wherein $$V_{additional} = \left\lfloor \frac{x}{2} \right\rfloor \text{ if } \sqrt{3}\,(y+0.5)r < n; \text{ and}$$

$$\delta = \begin{cases} 1, & \begin{array}{l} \text{if } (n - \sqrt{3}\,r(y - 0.5)) + \\ (E_{frac} - 1)r \leq \frac{\sqrt{3}\,r}{2} \text{ and } 1 < E_{fraction} < \\ 1.5 \text{ and } \sqrt{3}\,(y - 0.5)r < n < \sqrt{3}\,(y)r \end{array} \\ 1, & \begin{array}{l} \text{if } (n - \sqrt{3}\,r(y - 1)) + \\ (E_{frac} - 2.5)r \leq \frac{\sqrt{3}\,r}{2} \text{ and } 2.5 < E_{fraction} < \\ 3 \text{ and } \sqrt{3}\,(y - 1)r < n < \sqrt{3}\,(y0.5)r \end{array} \\ 0, & \text{otherwise} \end{cases}$$

wherein
x is the number of hexagonal areas covered by the edge of the rectangular area along the first direction, and
y is the number of hexagonal areas covered by the edge of the rectangular area along the second direction.

18. The location optimizing unit of claim 13, further comprising a Minimum Area Enclosing Rectangle (MAER) calculator for receiving the dimensions of the predefined area from the rectangular area generator, and determining the smallest area of rectangle that encloses the predefined area, wherein the smallest area of rectangle is the rectangular area generated by the rectangular area generator.

* * * * *

UNITED STATES PATENT AND TRADEMARK OFFICE
CERTIFICATE OF CORRECTION

PATENT NO. : 8,195,189 B2
APPLICATION NO. : 11/781274
DATED : June 5, 2012
INVENTOR(S) : Ravigopal Vennelakanti et al.

Page 1 of 1

It is certified that error appears in the above-identified patent and that said Letters Patent is hereby corrected as shown below:

On the Title page, in field (73), Assignee, in column 1, line 1, delete "Developmet" and insert -- Development --, therefor.

In column 11, line 52, in Claim 13, after "which" delete "fully".

Signed and Sealed this
Eighteenth Day of December, 2012

David J. Kappos
*Director of the United States Patent and Trademark Office*